United States Patent
McGregor

(10) Patent No.: US 6,799,633 B2
(45) Date of Patent: Oct. 5, 2004

(54) DOCKABLE DIRECT MECHANICAL ACTUATOR FOR DOWNHOLE TOOLS AND METHOD

(75) Inventor: Ronald W. McGregor, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/174,675

(22) Filed: Jun. 19, 2002

(65) Prior Publication Data

US 2003/0234110 A1 Dec. 25, 2003

(51) Int. Cl.[7] .......................... E21B 47/00; E21B 34/06
(52) U.S. Cl. ................... 166/250.01; 166/65.1; 166/373; 166/332.8; 166/332.4; 166/332.5; 340/854.4
(58) Field of Search ................ 166/373, 332.8, 166/332.4, 332.5, 250.01, 65.1, 334.1; 340/854.4, 854.9, 855.1

(56) References Cited

U.S. PATENT DOCUMENTS

| 4,862,808 | A | | 9/1989 | Hedgcoxe et al. |
| 5,203,646 | A | | 4/1993 | Landsberger et al. |
| 5,392,715 | A | | 2/1995 | Pelrine |
| 5,823,265 | A | * | 10/1998 | Crow et al. ............. 166/373 |
| 5,913,337 | A | | 6/1999 | Williams et al. |
| 5,947,213 | A | | 9/1999 | Angle et al. |
| 6,003,605 | A | * | 12/1999 | Dickson et al. ......... 166/375 |
| 6,016,845 | A | | 1/2000 | Quigley et al. |
| 6,026,911 | A | | 2/2000 | Angle et al. |
| 6,112,809 | A | | 9/2000 | Angle |
| 6,557,642 | B2 | * | 5/2003 | Head ......................... 166/381 |
| 2002/0066556 | A1 | * | 6/2002 | Goode et al. ............. 166/53 |
| 2002/0104661 | A1 | * | 8/2002 | Head ......................... 166/380 |
| 2002/0108747 | A1 | * | 8/2002 | Dietz et al. ............. 166/66.7 |
| 2003/0085815 | A1 | * | 5/2003 | Tilton et al. ............ 340/854.4 |

* cited by examiner

Primary Examiner—David Bagnell
Assistant Examiner—Giovanna Collins
(74) Attorney, Agent, or Firm—Peter V. Schroeder

(57) ABSTRACT

The present invention provides an improved system and method for performing a desired operation at a remote location in a wellbore. The system is composed of a downhole docking station assembly and a detachable downhole tool assembly. The downhole tool assembly includes electrically operated means to move in the wellbore and an end work device to perform the desired work. The downhole tool can also include an imaging device to provide pictures of the downhole environment and various sensors. Data from the downhole tool is communicated to a surface computer, which controls the operation of the tool and displays pictures of the tool environment. The downhole tool detaches itself from the docking station, travels to the desired location in the wellbore and performs a predefined operation according to programmed instruction. The downhole tool returns and connects to the docking station, where it transfers data relating to the operation and can be recharged for further operation. Various attachments for the downhole tool assembly can be stored and selectively retrieved for downhole locations.

31 Claims, 3 Drawing Sheets

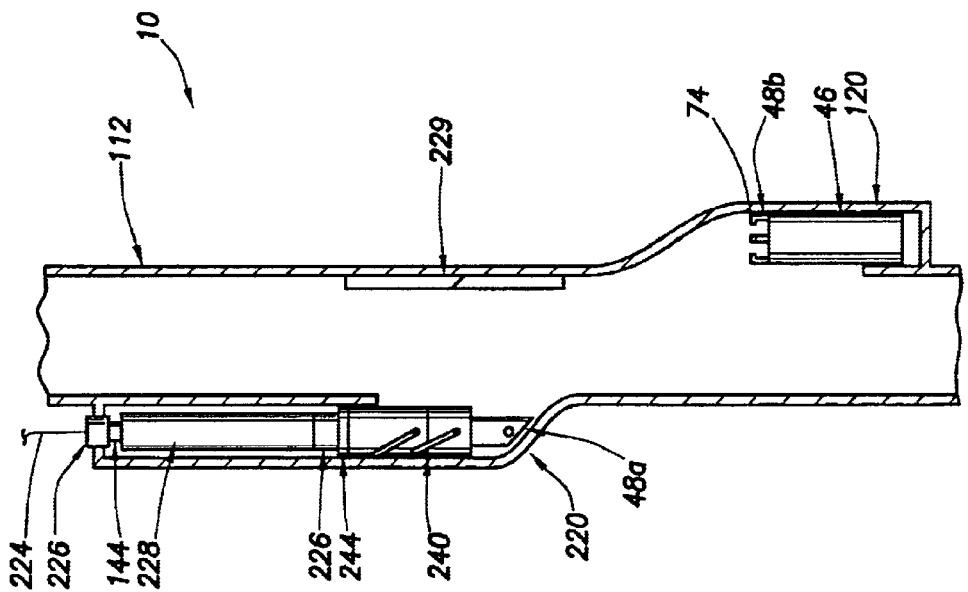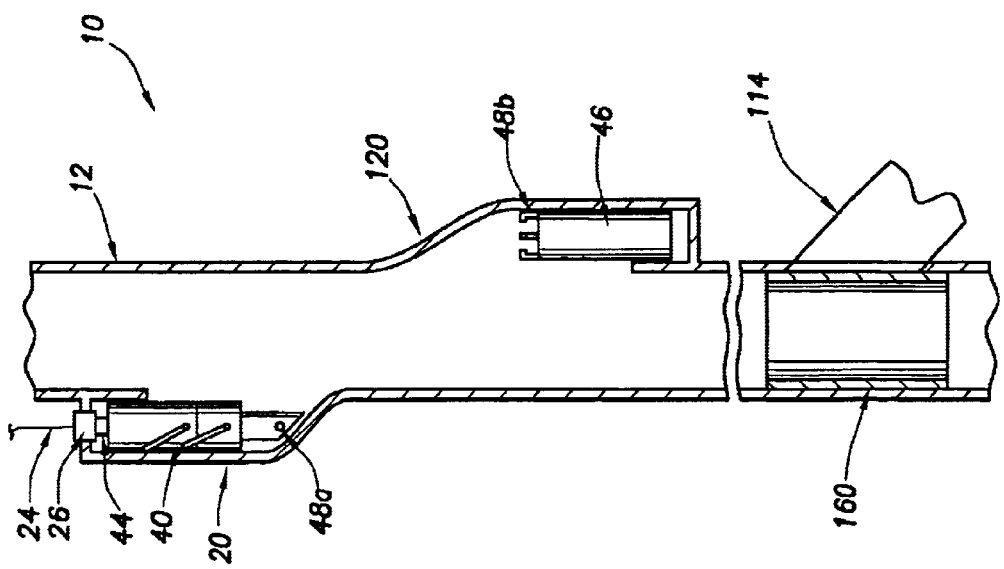

ns it does not solve the problems associated with the time and expense required in moving to these remote locations. When repeated or regular downhole operations are required in deep wells, moving the tractor units to and from the surface is unacceptable and uneconomical.

DOCKABLE DIRECT MECHANICAL ACTUATOR FOR DOWNHOLE TOOLS AND METHOD

TECHNICAL FIELD

The present inventions relate to improvements in robotic technology used in the oil and gas industry to significantly reduce oil and gas operational costs, especially in deep wells. More particularly the present inventions relate to the use of programmable tools permanently located downhole in a well and which can on demand perform various downhole tasks in the wells such as, for example, resetting safety valves, adjusting flow control devices; setting and removing downhole devices; measuring well parameters at various locations and condition, and retrieving measurement and performance data.

BACKGROUND OF THE INVENTIONS

During the wellbore completion phase of wells, a rig is normally present at the wellhead. Occasionally, the large drilling rig is removed and a small work rig is erected to perform completion operations. However, many operations during the completion phase could be performed without the use of a rig if a mobile platform robotic device could be utilized to move into position in the bottom hole assembly in the wellbore, especially in the horizontal sections of the wellbores. Wells usually continue to produce hydrocarbons for many years. Various types of operations are performed during the life of producing wells. Such operations include removing, installing and replacing different types of devices including fluid flow control devices, sensors, packers or seals; performing remedial work including sealing off zones, cementing, reaming, repairing junctures, milling and cutting; diverting fluid flows, controlling production from perforated zones; activating sliding sleeves, testing wellbore production zones or portions thereof, and making periodic measurements relating to wellbore and formation parameters. During the production phase or workover or testing operations, a rig is especially erected at the well site prior to performing many of these operations. Using conventional rig operations can be time consuming and expensive. The primary function of the rig in some of such operations is to convey, position and orient tools to the desired work site. A mobile platform robotic device that can move and position tools at the desired work site can allow the desired downhole tasks to be performed without requiring a rig and bulky tools and tool handling systems.

Mobile platform robotic devices tethered to the surface by wirelines or coil tubing are used in vertical and horizontal well operations. These devices sometimes called tractors can move in the well using various forms of traction devices. In deep wells, the use of a tether requires the tractor to generate excessive force as the distance increases to pull the tether. In extended downhole distances, time is consumed in moving the devices to location. Some tethered tractors carry a self-contained battery powered tractor unit that will disconnect from the tethered tractor to extend the operation range by performing downhole operations without a tether. Typically, communication systems are used to connect the untethered tractor to the tethered tractor. Examples of these units can be found in the U.S. Pat. Nos. 5,947,213; 6,026,911 and 6,112,809 owned by Intelligent Inspection Corporation. The disclosures of these patents are incorporated herein for all purposes.

While the proposed use of a detachable untethered unit can provide tool access to otherwise unreachable well loca-

SUMMARY OF THE INVENTIONS

The present inventions relate to using an electromechanical tractor that docks at a downhole docking station from which it exits, moves within the well to perform tasks and then returns to the docking station. Wells to which these inventions pertain, comprise all wells having subterranean portions. Although the present inventions have particular advantages when applied to deep locations in wells, the term downhole is used to include any location spaced from the wellhead. Down and up in this regard refer to a direction along the well toward the wellhead and away from the wellhead even though the actual portion of the well may not be vertically upright. Wellhead or surface includes both land and sub sea locations and in the latter case can refer to the seabed or water surface. Preferably, conductors connect the docking station to the surface for conveying power and control information. These conductors could be either embedded in the tubing wall or separate. The described examples use a docked tractor to move out into the well to mechanically open and close a subsurface safety valve or sliding sleeve valve as needed.

The task of operating the safety valve is just one operation that can be performed at these remote downhole locations without requiring the time consuming procedure of opening the well and moving the tractor assembly from the surface to the remote downhole location. These tasks could be as varied as removing, installing and replacing different types of devices including fluid flow control devices, sensors, packers or seals; performing remedial work including sealing off zones, cementing, reaming, repairing junctures, milling and cutting; diverting fluid flows, controlling production from perforated zones; activating, resetting and adjusting valves such as safety valves and sliding sleeves, testing wellbore production zones or portions thereof, making periodic measurements relating to wellbore and formation parameters, setting plugs remotely, or retrieving pressure temperature recording devices and uplink data to the surface via electronics located either onboard the tractor or in the docking station. As used herein the term tasks is used in its broadest generic sense to include all well operations.

More particularly, the tractor tool assembly could move from a downhole docking station to a valve and engage the valve and perform the task of opening, closing or adjusting it. In the safety valve embodiment the tractor could have a tool that locks into a profile on the safety valve's flow tube and then the tractor would extend against the tubing wall and telescope, forcing the valve to the open position. When the flow tube reaches the valve open position, a mechanical or electrical powered lock or latch engages and holds the flow tube in the open position. In this embodiment, the remote controlled tool then disengages from the valve and retreats to the docking station.

The docking stations in the disclosed embodiments are in the form of a side pocket mandrel assembled in the production tubing. As used herein docking means or tractor docking station includes any location downhole in the well where the tractor can reside in the well when not in use. In tractors whose profile causes minimal flow restrictions docking in the main wellbore itself is possible, in other cases it is preferable for the tractor to be docked in a side pocket mandrels or branching bores out of the wellbore. Preferably, the docking means provides a source of power for the tractor either in the form of a conductor or receptacle for recharging batteries onboard the tractor. Various embodiments of means for supplying electrical power to the docking station are envisioned, including conductors extending to the surface, rechargeable or chemical batteries, and downhole electrical power generators. The tractor is operably associated with the docking station, in that, it receives power from the docking station allowing it to remain downhole indefinitely and perform repeated tasks without leaving the well tubing. In some embodiments, the tractor is also operably associated with the docking station by receiving its operating instructions from the docking station either by hardware or wireless means. In this invention, the remote controlled tractor and the valve assembly are all in direct, intimate contact with the wellbore fluid, and thus are inherently pressure balanced with wellbore fluid pressure. This feature makes the performance of the valve insensitive to setting depth.

The tractor could be powered by onboard batteries that are charged when the tractor is docked. In that position, the tractor could engage an electrical socket that would charge the batteries when the tractor is in the stowed position. The tractor could be signaled by a spooled control wire or could be wireless. The tractor could be programmed to travel a certain distance then seek the profile and engage it. Once full stroked, the tractor could disengage the profile and crawl back home or be flowed back into the docking station. Once in the docking station, the tractor would plug into the power socket to be charged for the next cycle. Alternatively, the tractor could drag a power and control conducting tether from the docking station to the task location. The tether could be mechanically retractable (spooled) to quickly return the tractor to its docking station.

The term tractor means or tractor assembly means is used to refer to a self propelled device that can move about the wellbore without mechanical connection to the well surface and includes but is not limited to the particular tractor and robots described herein directly and by reference. The means for moving the tractor about the wellbore can include wheels, endless tracks, articulating inchworm type devices, propellers, cable-spool assemblies and the like. The moving means can be powered by solenoids, actuators, motors and other electrically operable means or hydraulically operated via electrical control devices. Means for performing tasks on the tractor can be a manipulateable arm, rotating device or the like. Each tractor has a means for controlling the movement means and task performing means which can comprise a programmable computer on the tractor or remote from the tractor.

A variety of tools could be stored downhole in tool stations and picked up and used by the tractor means as required to perform the desired task.

As such, these tractors could be individually addressable by wire or wireless commands to perform various tasks. Means for communicating with the tractor is provided and includes both wire and wireless communication links. Wireless includes electromagnetic, optical, acoustic, and pressure transmissions.

Therefore it may be seen that an array of tractors could be located within a wellbore and associated laterals to perform a diversity of tasks.

BRIEF DESCRIPTION OF THE DRAWINGS

The accompanying drawings are incorporated into and form a part of the specification to illustrate several examples of the present inventions. These drawings together with the description serve to explain the embodiment and operations of the inventions. The drawings are only for the purpose of illustrating preferred and alternative examples of how the inventions can be made and used and are not to be construed as limiting the inventions to only the illustrated and described examples. The various advantages and features of the present inventions will be apparent from a consideration of the drawings in which:

FIG. 4 is a side elevation view partially in section illustrating another embodiment of the docking station and dockable mechanical tractor of the present inventions with a downhole tool storage site; and FIG. 5 is a side elevation view partially in section illustrating a further embodiment of the docking station and dockable mechanical tractor of the present inventions with a removable docking station.

DETAILED DESCRIPTION

Figure 1:
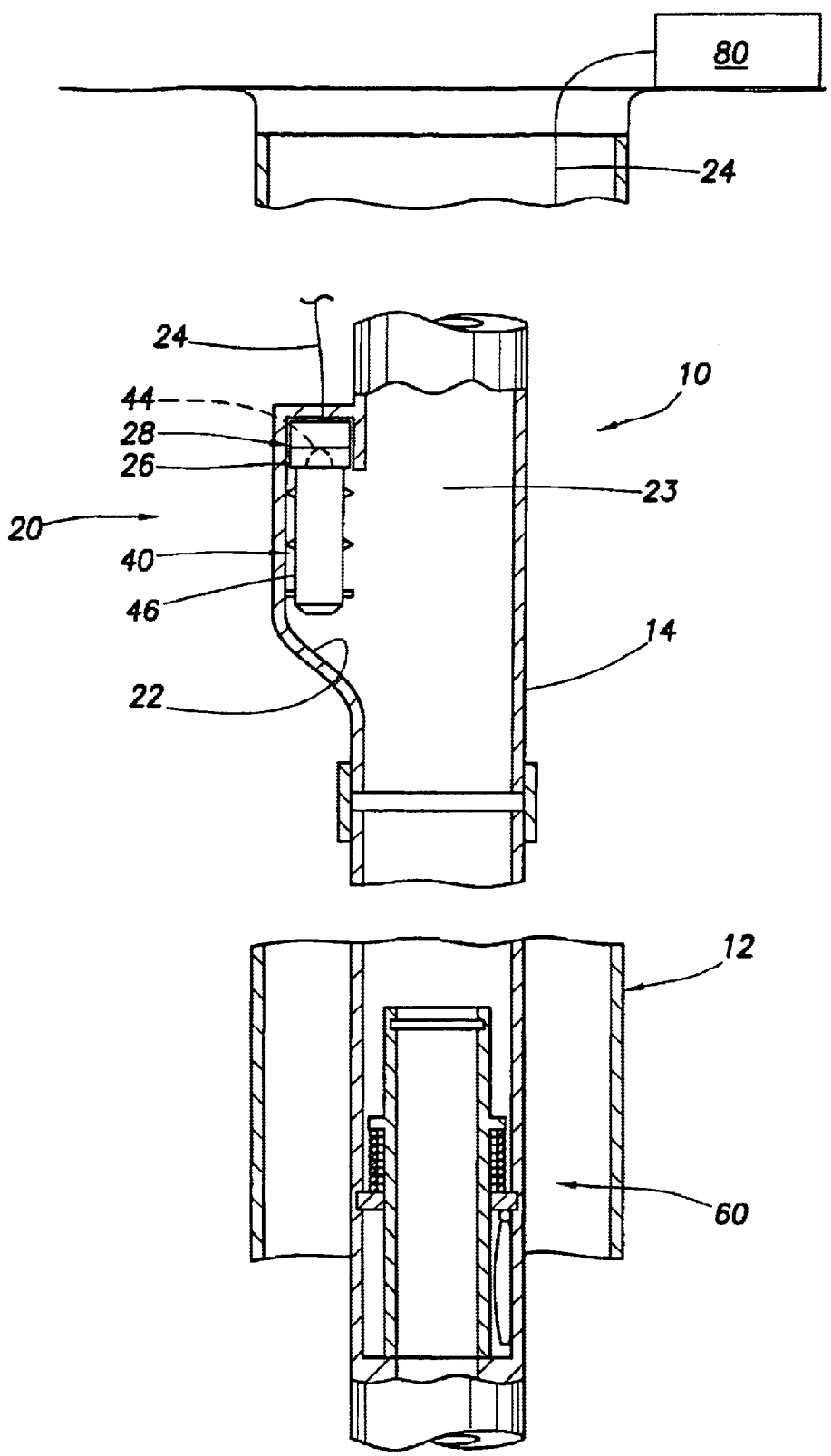
FIG. 1 is a side elevation view partially in section illustrating an embodiment of the docking station and dockable mechanical tractor of the present inventions shown installed in a subterranean location in a cased well adjacent to a subsurface well safety valve.

The present inventions are described by reference to drawings showing one or more examples of how the inventions can be made and used. In these drawings, reference characters are used throughout the several views to indicate like or corresponding parts.

In FIG. 1 a portion 10 of a subterranean well is illustrated. Although, not shown the portion 10 is located a sufficient distance below the land or sea surface to require substantial effort to mechanically operate or engage downhole tools at this depth. The illustrated configuration could, for example, be in a deepwater well or at a difficult to reach lateral location. The illustrated portion 10 is cased 12 and contains a tubing string 14. A schematic representation of a docking station assembly 20, tractor assembly 40 and a subsurface safety valve assembly 60 is illustrated. In FIG. 1, the safety valve assembly 60 is in the open or flow position and as is well known in the industry will move to the closed position as required. This particular safety valve design is electrically signaled and mechanically operated. As will be described the valve will close upon loss of electrical power to the valve. The tractor 40 is used to reopen the valve. The inventions are described in this embodiment as servicing a subsurface safety valve, but it is to be understood that other subsurface operations and tools could be utilized. In the FIG. 1 embodiment, the remote controlled tractor 40 moves along the tubing string 14 from the docking station 20 to the safety valve 60. It engages the safety valve 60 to operate it. After completing the task the tractor 40 is returned to the docking station 20 where it remains until needed.

Preferably the docking station 20 is connected in the tubing string 14 a convenient distance from the safety valve 60 and any other tools (not shown) which the tractor is to service. The docking station 20 is illustrated as comprising a side pocket type mandrel with a cavity or side pocket bore 22 of sufficient size to dock the tractor 40. When the tractor 40 is in the cavity 22, it is out of the main bore 23 of the tubing string and provides no restrictions to full bore access to the well. Although docking configurations which provide some limitations or restrictions on the full bore size are acceptable, no bore restriction is preferable. Other possible docking station configurations would include docking in a lateral or even docking within the well bore itself.

Figure 2:
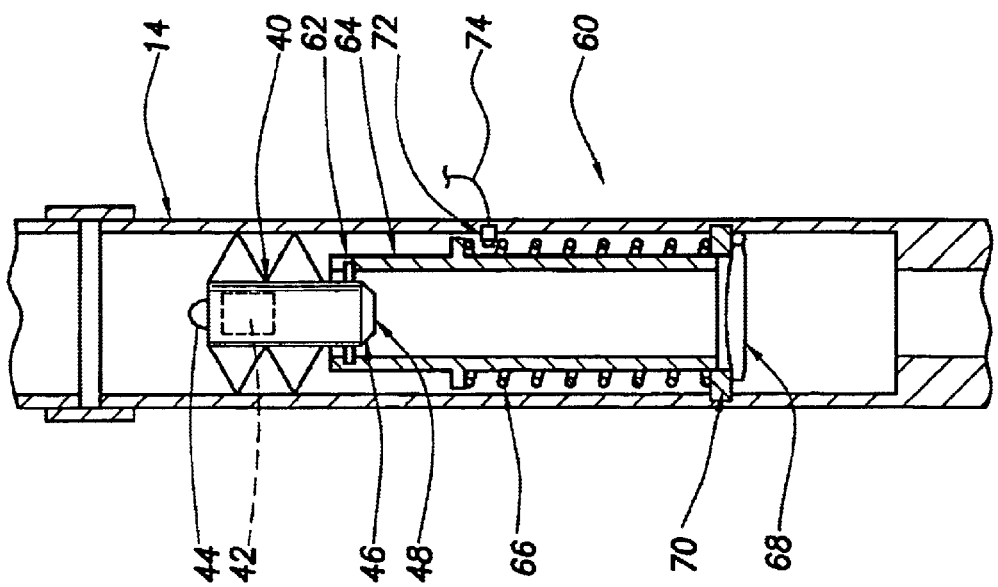

The docking station contains a means providing a source of electrical power. In this illustrated embodiment, one or more power conductors such as cable 24 act as the power source means. Cable 24 extends to the well surface in the annulus formed between the tubing string 14 and the casing 12. Preferably an electrical connector 26, such as a receptacle or plug, is located in the docking station for releasable connection to the tractor assembly 40. In FIG. 2, a suitable mating socket connector 44 can be located on the tractor 40.

Depending on the particular configuration of the present invention one or more conductors could be present in connector 26. The one or more electrical conductors of the cable 24 could be embedded in the wall of the tubing string 14 to transport power and data to the docking station. Examples of tubing strings with embedded conductors are described in U.S. Pat. Nos. 5,913,337 and 6,016,845. Although not illustrated in this figure, the present inventions include combinations using tubing embedded conductors and the descriptions and drawings of the above embedded conductor patents are included herein in their entirety by reference for all purposes.

In another embodiment, the docking station's power source means is an electrical storage device such as batteries located downhole near the docking or in the docking station processing unit 28. These batteries could be recharged by down hole power generation, conductors to the surface, or movable service tools.

Docking station 20 includes means for controlling the operation of the tractor. Cable 24 can act as a means and can contain one or more data conductors extending from the docking station to the surface for providing instructions to the station and tractor. Conductors in cable 24 could be shared for both data and power transmission to the docking station. Alternatively, data could be transmitted wirelessly to a receiver in the processing unit 28, which acts as a means for controlling the operation of the tractor. Alternatively, data and instructions could be transmitted wirelessly from the docking station to a processing unit on the tractor assembly 40.

Docking station 20 could be provided with a processing means 28 providing one or more data storage, data processing, power storage, and information, transmission or reception. In embodiments where the tractor 40 is tethered to the station by a data and/or power conductors, a series of operating instructions can be conveyed to the tractor 40 through the conductors. Where the tractor 40 is untethered to the docking station, wireless instructions can be transmitted to and from the tractor and the well surface or the docking station 20. If the docking station is used as the instruction transmitter then a transmitter and signal processor for the wireless signals will be present in the docking stations processing unit 28.

Tractors suitable for use in a wellbore are the MULE brand downhole tractors are available from Sondex Ltd. of the United Kingdom; the Omega brand tractor is available from Omega Completion Technology Ltd. of the United Kingdom; and the SmarTract brand wireline tractor are available from SmarTract, Inc. of Houston, Tex. Examples of the structures of these tractors are disclosed in U.S. Pat. Nos. 5,947,213; 6,026,911 and 6,112,809 and for purposes of efficiency the descriptions contained in these patents are incorporated herein by reference in their entirety as if the entire patent had been reproduced here. The tractors 40 of this invention can be either tethered or untethered, having either conductor-supplied power or onboard power sources and can be controlled through either wired control or wireless communications. Also, the tractors 40 can include onboard movement and task control means including instruction processors, data storage and memory, sensors, cameras, batteries, receivers, transmitters, and the like, such as described in the above patents and commercially available products.

Tractors 40 have self contained means for moving about the wellbore. In the above patents one means for moving about the wellbore is an inchworm type mechanism wherein the "body" changes in axial length while "legs" selectively engage the wellbore. Other means for moving include endless belts and wheels engaging the wellbore to move. Moving means may also include using a flexible line to pull the tractor along the wellbore or even a rotating propeller move in the well fluids.

U.S. Pat. Nos. 4,862,808 to Hedgcoxe et al., 5,203,646 to Landsberger et al. and 5,392,715 to Pelrine disclose means for moving through the interior of a pipe. The Hedgcoxe et al. patent discloses a robotic pipe crawling device with two three-wheel modules pivotally connected at their centers. The Landsberger et al. patent discloses an underwater robot that is employed to clean and/or inspect the inner surfaces of high flow rate inlet pipes. The robot crawls along a cable positioned within the pipe to be inspected or cleaned. A plurality of guidance fins rely upon the flow of fluid through the pipe to position the robot as desired. Retractable legs can fix the robot at a location within the pipe for cleaning purposes. A fluid driven turbine can generate electricity for various motors, servos and other actuators contained onboard the robot. The robot also can include wheel or pulley arrangements that further assist the robot in negotiating sharp corners or other obstructions. The Pelrine patent discloses an in-pipe running robot with a vehicle body movable inside the pipe along a pipe axis.

In the embodiment illustrated in FIGS. 1 and 2, an inchworm configuration (shown schematically) is used as a means for moving to allow the tractor 40 to move back and forth along the wellbore. It is intended that any one of the means for moving the tractor described above could be used. The description of the various moving means from the above patents and products is included the corresponding structures for the moving means. One or more tools 46 can be provided on the tractor 40 for performing down hole tasks.

The tractor assembly 40 includes the mobile platform and the tool 46 and may include an imaging device and any other desired device that is required to perform the desired downhole operations. Tractor assembly 40 preferably includes a processing unit 42 which acts as a control means containing all the electronics, data gathering and processing circuits and computer programs and communication electronics, required to perform operations downhole with or without the aid of a surface control unit 80. A suitable telemetry or acoustic system or the like may also be utilized in the surface unit 80, docking station 20 and the processing unit 42 to communicate command signals and data between the tractor assembly 40 and the docking station 20 and/or surface control unit 80. The tractor assembly 40 terminates at its uphole end with an electrical connector 44 matching a detachable connector 26 at docking station 20. The tractor assembly 40 is designed so that upon command or in response to programmed instructions associated therewith, it can cause the connector 44 on tractor assembly 40 to detach itself from the connector 26 at docking station 20 and travel to the desired work site in the tubing string 14 to perform the intended operations.

To operate the tractor assembly 40, the docking station 20 receives instructions from the surface unit controller 80. The docking station controller 28 contains data communication links for transporting data and signals between the tractor assembly 40 and the surface control unit 80. Upon command from the surface control unit 80 or according to programmed instructions stored in the processing unit 28 or 42, the tractor assembly 40 detaches itself from the docking station 20 and travels downhole to the desired work site (such as the safety valve 60) and performs the intended operations. The illustrated safety valve assembly 60 is connected in the tubing string. Alternatively, the safety valve 60 could be a retrievable safety valve connected inside the tubing string. Tractor assembly 40 is useful for performing periodic maintenance operations such as cleaning operations, testing operations, data gathering operations with sensors deployed thereon, gathering data from sensors installed in the tubing string 14 or for operating devices such as a fluid control valve or a sliding sleeve. After the mobile tractor assembly 40 has performed the intended operations, it returns to the docking station 20 and reconnects itself via the connectors 44 and 26. The tractor assembly includes batteries which can be recharged by power supplied from the docking station 20.

As a fail-safe measure, the tractor could be programmed to return to the docking station if it loses its current instructions. At the docking station the tractor could be reprogrammed with instructions. The return program could be hard wired (such as in an EPROM type circuit) in the tractor's instructions.

As an alternative embodiment (not shown), a data conductor or control line can connect the tractor assembly 40 to the docking station 20. In this tethered embodiment, instructions are provided to the tractor 40 via the conductor. In this embodiment long power and control cables extending to the surface are replaced by light control cables extending to the closely located docking station. Additionally, the control line can be spooled out as the tractor moves from the docking station to the work site and the tractor returned to the docking station by reeling in the spool of control line. The spool could be electrically powered and located on either the tractor or docking station.

Figure 3:
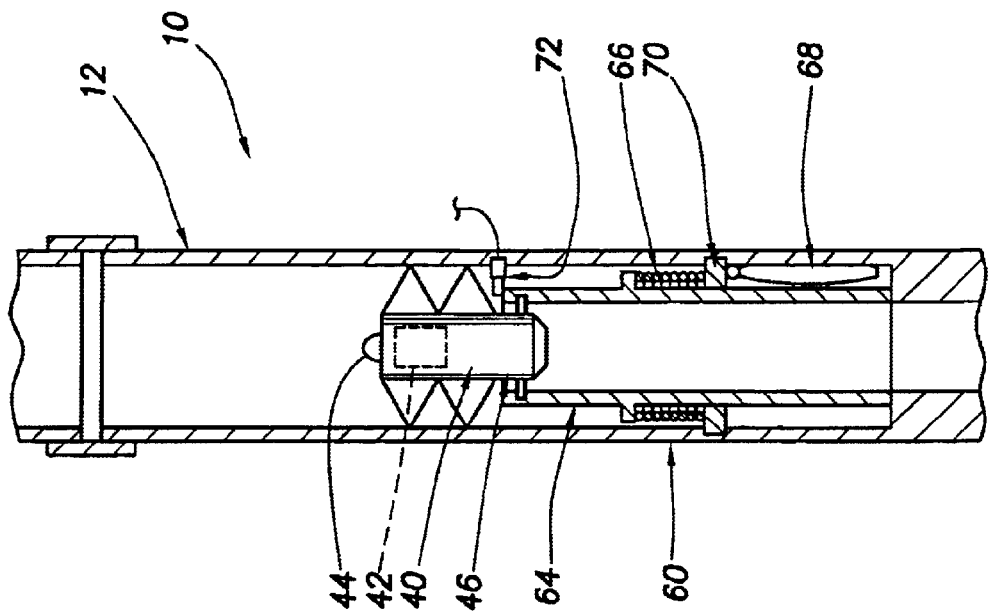
FIGS. 2 and 3 are views similar to FIG. 1 showing the tractor engaging a closed safety valve and opening the valve.

In FIG. 2 the safety valve 60 is in the closed condition. The tool 46 on the tractor 40 assembly has profile 48 for engaging a profile 62 in the flow tube 64 of the safety valve 60 or some other assembly such as flow control (e.g., sliding sleeve) valve. The remote controlled tractor 40 has "crawled" along the tubing string 14 from the docking station to the safety valve 60 and has engaged the profile 62 on the flow tube. Once the tool 46 is locked into the profile 62, tractor 40 extends against the wall of tubing string 14 and telescopes, forcing the flow tube 64 downward to the open position FIG. 3. When the flow tube 64 reaches the valve open position, an electro-mechanical lock or latch 72 engages and holds the bore closure assembly in the open position. In the illustrated embodiment an electro-mechanical lock 72 engages the flow tube to hold it down with the spring 66 compressed and the valve closure element 68 open away from its seat 70. Electrical power supplied from the surface through conductor 74 is required to maintain latch 72 engaged with the flow tube to hold it in the open condition illustrated in FIG. 3. The tractor 40 disengages from the valve 60 and retracts to a stowed position in the docking station 20, illustrated in FIG. 1. In addition the tractor assembly 40 could be used open or to set and remove retrievable safety valves.

The embodiment illustrated in FIG. 4 includes a docking station 20 and tractor assembly 40. The tractor assembly 40 is shown docked in the station 20 with its connector 44 engaging the connector 26. In this embodiment, the docking station is "dumb" and includes onboard data storage and processing unit. The processing unit for controlling the operations of the tractor assembly 40 is onboard the tractor. Cable 24 can convey power and communications between the surface and the tractor 40 when it is docked in the station 20. Alternatively, surface communication is wireless. According to a particular feature of this embodiment one or more side pocket mandrel tool storage stations 120 (only one is illustrated) for storing tools 46 that can be releasably attached to the tractor 40. Tools for use in performing different tasks can be stored downhole and connected to the tractor when needed. Tool 46 has a connector or receptacle 48b that releasably mates with a connector 48a on the tractor. When needed, the tractor 40 disengages from the docking station 20, moves to one of the tool storage station 120, and engages and connects to the tool 46 with releasable connectors 48a and 48b. In this embodiment the tool 46 is for use in opening or adjusting a sliding sleeve valve 160 controlling flow from a branching bore 114. After completing the task the tractor returns the tool 46 to the station 120 and moves into the storage position in the station 20.

In FIG. 5, an alternative configuration of the docking station is illustrated. In this embodiment, the docking station 220 utilizes a removable data storage and processing unit 228. Docking station 220 is configured as a side pocket mandrel with connector 226 at its upper end for engaging connector 244 on unit 228. Unit 228 can contain batteries for storing electrical power, cable spools for tethered configurations, data storage and computing means for controlling the tractor's movements, communication equipment for sending information, data and instructions to and from docking station and the tractor and surface controller. As is well known in the art, the unit 228 can be latched in place and removed using a wire line or other setting devices in the same manner as valves are set in side pocket mandrels. This allows the unit 228 to be installed as a last step during completion (or even later) and to be replaced if it malfunctions or needs to be replaced. It is envisioned that the tractor assembly 40 could be installed and removed with the unit 228 and in the untethered version installed independently. Mating connector 226 on the unit 228 mates with docking connector 44 on tractor 40 as previously described with respect to FIGS. 1–4.

In addition tubing 112 contains embedded conductors 224 which terminate at connector 226. As previously described conductors 224 extend to the surface and can be used to provide power and to communicate data and instructions between the docking station and the surface. Preferably, a locating profile 229 is located adjacent the docking station.

In these examples, the remote controlled tool 40 and the safety valve assembly 60 are all in direct, intimate contact with the wellbore fluid, and thus are inherently pressure balanced with wellbore fluid pressure. This feature makes the performance of the valve 60 insensitive to setting depth.

The tractor could be powered by onboard batteries that are charged when the tractor is docked in a side pocket mandrel. In that position, the tractor could engage a socket that would charge the batteries when the tractor is in the stowed position. The tractor could be signaled by a spooled control wire or could be wireless. The tractor could be programmed to travel a certain distance then seek the profile and engage it. Once fully stroked, the tractor could disengage the profile and crawl or spool back or even be flowed back to the docking station. Once in the docking station, the tractor would plug into the power socket to be charged for the next cycle.

Furthermore, this tractor could be stowed (as described above) in lateral docking stations, then deployed to perform certain tasks. As such, these tractors could be individually addressable for tasks by wire/wireless commands. An array of tractors could be located within a wellbore and associated laterals to perform a diversity of tasks. These operations could be as varied as adjusting flow control devices such as sliding sleeve valves to setting plugs remotely. Another possible task would be to retrieve pressure/temperature recording devices and uplink data to the surface via electronics located either onboard the tractor or in the docking station.

The embodiments shown and described above are only exemplary. Many details are often found in the art such as the tractor assemblies both tethered and untethered and communication and control systems. Therefore, many such details are neither shown nor described. It is not claimed that all of the detail parts, elements, or steps described and shown were invented herein. Even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims.

The restrictive description and drawings of the specific examples above do not point out what an infringement of this patent would be, but are to provide at least one explanation of how to make and use the inventions. The limits of the inventions and the bounds of the patent protection are measured by and defined in the following claims.

What is claimed is:

1. A method of performing a task in a subterranean location in a well tubing having a main bore, the method comprising the steps of:
   a. installing a docking station at a downhole location in communication with the interior of the well tubing,
   b. locating a tractor at the docking station, the tractor comprising means to move axially within the well tubing and means to perform a task, the main bore substantially free from obstruction by the tractor while the tractor is located at the docking station,
   c. operating the moving means on the tractor to position the tractor assembly at a location in the well tubing where the task is to be performed,
   d. operating the task performing means on the tractor to perform the task, and
   e. thereafter, operating the moving means on the tractor to locate the tractor at the docking station.

2. The method of claim 1 additionally comprising the steps of repeating steps c through e without removing the tractor from the subterranean portion of the well.

3. The method of claim 1 additionally comprising the step of supplying electrical power to the tractor from the docking station.

4. The method of claim 3 wherein the step of supplying electrical power to the tractor comprises transmitting electrical power through a conductor connected between the docking station and the tractor.

5. The method of claim 3 wherein the step of supplying electrical power to the tractor comprises transmitting electrical power through a conductor connected between the docking station and the well surface.

6. The method of claim 3 wherein the step of supplying electrical power to the tractor comprises releasably connecting a connector on the docking station to a connector on the tractor and transmitting electrical power through the connector to an electrical power storage device on the tractor.

7. A method as in claim 1 further comprising the step of tethering the tractor to the docking station.

8. A method as in claim 1 wherein the main bore is completely free from obstruction by the tractor while the tractor is located at the docking station.

9. Method of performing tasks at downhole locations in a well having a bore for fluid flow, without accessing the well from the surface, comprising the steps of:
   storing a tool for performing the tasks at a downhole storage location substantially removed from the bore;
   moving the tool from the storage location to a second downhole location in the well;
   performing a task at the second location; and
   thereafter, returning the tool to the storage location without returning the tool to the surface.

10. The method of claim 9 wherein the tool comprises a tractor means and means operable by the tractor for performing a task.

11. The method of claim 9 wherein means for docking the tool is provided at the storage location and wherein the docking means comprises means for providing power to operate the tool.

12. A method as in claim 9 further comprising the step of tethering the tool to the storage location.

13. A sub-service safety valve and service assembly for a well for controlling the flow of fluids through a tubular assembly having an axial bore, the tubular assembly extending from a downhole location to the well surface, comprising:
   a normally closed safety valve for controlling the flow through the valve when the valve is connected to the tubular assembly, the valve comprising a valve member moveable in and out of a normally closed position wherein flow through the valve is prevented, a valve actuator for moving the valve to the closed position; and
   a tractor docked at a downhole location substantially removed from the axial bore of the tubular assembly, the tractor comprising means on the tractor for moving into and out of engagement with the valve member to move the valve member out of the closed position.

14. The subsurface safety valve of claim 13 wherein the valve actuator comprises a flow tube moveable into and out of contact with the valve member to hold the valve member away from the closed position, means urging the flow tube out of contact with the valve member to allow the valve member to move to the closed position, and a latch for releasably retaining the flow tube in contact with the valve member holding the valve member away from the closed position.

15. The subsurface safety valve of claim 14 wherein the latch is electrically operable from the well surface whereby the valve can be closed from the well surface.

16. The subsurface safety valve of claim 13 wherein the tractor is docked at a docking station and wherein the docking station comprises a means for supplying power to the tractor.

17. The subsurface safety valve of claim 16 wherein the docking station is a side pocket mandrel.

18. The subsurface safety valve of claim 16 wherein the docking station is operably associated with the tractor.

19. The subsurface safety valve of claim 18 wherein wireless receivers and transmitters operably associate the tractor and the docking station.

20. The subsurface safety valve of claim 18 wherein at least one electrical conductor operably associates the tractor and docking station.

21. The subsurface safety valve of claim 18 wherein mating electrical connectors are located on the docking station and the tractor and the tractor and docking station are operably associated by releasably connecting the electrical connector on the tractor to the electrical connector on the docking station.

22. The subsurface safety valve of claim 16 wherein the means for supplying power to the tractor comprises at least one electrical conductor connected between the tractor and docking station.

23. The safety valve of claim 16 wherein the means for supplying power to the tractor comprises mating releasable connectors located on the docking station and tractor.

24. The safety valve of claim 13 wherein the safety valve is a retrievable safety valve connected inside the tubular assembly.

25. A well having a tubular assembly extending from the well surface to a downhole location the tubular assembly having a primary bore, the well comprising:
a tractor located at a downhole location in the tubular assembly, means on the tractor for moving the tractor in and out of one or more downhole locations in the tubular assembly; and
a docking station at a downhole location in the tubular assembly, the docking station being operably associated with the tractor, means on the docking station for supplying power to the tractor, the docking station capable of storing the tractor substantially out of the primary bore.

26. The well of claim 25 wherein the docking station is a side pocket mandrel.

27. The well of claim 25 wherein wireless receivers and transmitters operably associate the tractor and the docking station.

28. The well of claim 25 wherein at least one electrical conductor operably associates the tractor and docking station.

29. The well of claim 25 wherein mating electrical connectors are located on the docking station and the tractor and the tractor and docking station are operably associated by releasably connecting the electrical connector on the tractor to the electrical connector on the docking station.

30. The well of claim 25 wherein the means for supplying power to the tractor comprises at least one electrical conductor connected between the tractor and docking station.

31. The well of claim 25 wherein the means for supplying power to the tractor comprises mating releasable electrical connectors located on the docking station and tractor.

* * * * *